(12) United States Patent
Fabijanic et al.

(10) Patent No.: US 11,859,292 B2
(45) Date of Patent: Jan. 2, 2024

(54) METHOD FOR SURFACE MODIFICATION OF TITANIUM AND TITANIUM ALLOY SUBSTRATES

(71) Applicant: CALLIDUS WELDING SOLUTIONS PTY LTD, Wangara (AU)

(72) Inventors: Daniel Fabijanic, Wangara (AU); Gary Lantzke, Wangara (AU); Joseph Ellis, Wangara (AU)

(73) Assignee: Callidus Welding Solutions Pty Ltd, Wangara (AU)

( * ) Notice: Subject to any disclaimer, the term of this patent is extended or adjusted under 35 U.S.C. 154(b) by 129 days.

(21) Appl. No.: 17/604,721

(22) PCT Filed: Apr. 16, 2020

(86) PCT No.: PCT/IB2020/053580
§ 371 (c)(1),
(2) Date: Oct. 18, 2021

(87) PCT Pub. No.: WO2020/212883
PCT Pub. Date: Oct. 22, 2020

(65) Prior Publication Data
US 2022/0178009 A1 Jun. 9, 2022

(30) Foreign Application Priority Data

Apr. 18, 2019 (AU) ................. 2019901347

(51) Int. Cl.
*C23C 8/24* (2006.01)
*C23C 8/80* (2006.01)

(52) U.S. Cl.
CPC . *C23C 8/24* (2013.01); *C23C 8/80* (2013.01)

(58) Field of Classification Search
CPC .................. C23C 8/24; C23C 8/80
See application file for complete search history.

(56) References Cited

U.S. PATENT DOCUMENTS

| | | | |
|---|---|---|---|
| 4,465,524 A | 8/1984 | Dearnaley et al. | |
| 5,009,966 A | 4/1991 | Garg et al. | |
| 5,455,079 A | 10/1995 | Oden et al. | |
| 10,151,021 B2 | 12/2018 | Curran et al. | |

FOREIGN PATENT DOCUMENTS

| | | |
|---|---|---|
| EP | 0246828 | 11/1987 |
| JP | 05-148598 A | 6/1993 |

OTHER PUBLICATIONS

Fogagnolo et al. (2016) "Surface stiffness gradient in Ti parts obtained by laser surface alloying with Cu and Nb" Surface and Coatings Technology 297:34-42.
Nemani et al. (2016) "Liquid phase surgace nitriding of Ti—6Al—4V pre-placed with chromium" Materials Chemistry and Physics 178:98-103.
Pang and Yue (2005) "Laser surface coating of Mo-WC metal matrix composity on Ti6Al4V alloy" Material Science and Engineering A390:144-153.
Selamat et al. (2006) "XRD and XPS studies of surface MMC layers developed by laser alloying Ti—6Al—4V using a combination of a dilute nitrogen environment and SiC powder" Surface and Coatings Technology 201:724-736.

*Primary Examiner* — Jessee R Roe
(74) *Attorney, Agent, or Firm* — FisherBroyles, LLP; Cara L. Crowley-Weber; Gregory T. Fettig

(57) ABSTRACT

A method for surface modification of a titanium substrate or a titanium alloy substrate comprising: a) applying at least one beta phase stabiliser to a surface of the titanium substrate or titanium alloy substrate; and b) heating the surface so as to alloy titanium with the at least one beta phase stabiliser.

11 Claims, 9 Drawing Sheets

METHOD FOR SURFACE MODIFICATION OF TITANIUM AND TITANIUM ALLOY SUBSTRATES

This application is a National Stage of PCT/IB2020/053580, filed Apr. 16, 2020, which claims priority to Australian Patent Application No. 2019901347, filed Apr. 18, 2019, each hereby expressly incorporated by reference in its entirety and each assigned to the assignee hereof.

FIELD

This invention relates to a method for surface modification of titanium and titanium alloy substrates.

BACKGROUND

Titanium and titanium alloys are widely used in many engineering applications due to their good specific strength and excellent corrosion resistance in a range of harsh environments. However, poor wear resistance has restricted their use in many engineering applications. Surface modification is a method that increases the surface hardness and wear resistance of titanium and titanium alloys in order to improve performance or open the way for new applications.

Surface nitriding is an established surface modification method that increases the hardness and wear resistance of titanium and titanium alloys without significantly affecting the corrosion resistance. Typically, nitriding involves enrichment of the surface of titanium or titanium alloys in nitrogen derived from a gaseous nitrogen source. The enrichment of nitrogen into the titanium surface can be diffusion-based, such as by ion implantation or thermal heterogeneous decomposition of a nitrogen-rich gas (eg, ammonia) at the surface. Other nitriding processes are based on controlled surface melting of titanium in a nitrogen-rich atmosphere where a reaction between molten titanium and nitrogen results in a nitrogen-rich surface after solidification. Energy sources for surface melting may be laser-based or electrical/plasma arc-based. In general, diffusion-based processes produce nitride layers that are thin (<1 mm), whilst surface melting-based processes are capable of producing much thicker nitride surface modifications, such as up to 10 mm in thickness.

In view of the above background, there is a need for alternative surface modification methods that deliver titanium and titanium alloy substrates with improved properties, such as for example improved wear and corrosion resistance.

SUMMARY

In a first aspect the present invention provides a method for surface modification of a titanium substrate or a titanium alloy substrate comprising:
(a) applying at least one beta phase stabiliser to a surface of the titanium substrate or titanium alloy substrate; and
(b) heating the surface so as to alloy titanium with the at least one beta phase stabiliser.

The titanium alloy may be an alpha, beta, alpha-beta or near-alpha alloy.

The titanium alloy may be a Grade 5 (Ti-6Al-4V) or Grade 12 alloy.

The titanium may be Grade 2 titanium.

The beta phase stabiliser may be a beta isomorphous element or a beta-eutectoid element.

The beta isomorphous element may be tungsten, vanadium, molybdenum, niobium, tantalum or any combination thereof. In one embodiment, the beta isomorphous element is tantalum, niobium or molybdenum.

The beta-eutectoid element may be chromium, iron, copper, silicon, manganese or any combination thereof. In one embodiment, the beta-eutectoid element is copper, silicon or manganese.

The beta phase stabiliser may be a compound comprising a beta phase stabiliser element.

The compound comprising a beta phase stabiliser element may be a carbide, oxide or intermetallic compound.

The compound comprising a beta phase stabiliser element may be tungsten carbide.

Step (a) may further comprise applying titanium to the surface together with the at least one beta phase stabiliser.

Step (a) may further comprise applying TiC or TiN to the surface together with the at least one beta phase stabiliser.

Step (a) may be performed by electrodeposition, electroless deposition, thermal spraying, slurry coating, wire deposition, chemical vapour deposition, physical vapour deposition or plasma vapour deposition.

Step (a) may be performed by atmospheric plasma spraying (APS).

Step (b) may be performed by subjecting the surface to an electric arc or a plasma arc.

Step (b) may be carried out in the presence of nitrogen so as to nitride the surface.

The nitrogen may be nitrogen gas.

Step (b) may be carried out in the presence of nitrogen gas and an inert gas so as to nitride the surface.

The inert gas may be argon.

Steps (a) and (b) may be carried out simultaneously.

The method may comprise a plurality of nitriding steps.

In an embodiment of the first aspect the present invention provides a method for surface modification of a titanium substrate or a titanium alloy substrate comprising:
(a) applying at least one beta phase stabiliser to a surface of the titanium substrate or titanium alloy substrate; and
(b) heating the surface in the presence of nitrogen so as to nitride the surface and alloy titanium with the at least one beta phase stabiliser.

In another embodiment of the first aspect the present invention provides a method for surface modification of a titanium substrate or a titanium alloy substrate comprising:
(a) nitriding a surface of the titanium substrate or titanium alloy substrate;
(b) applying at least one beta phase stabiliser to the surface of the titanium substrate or titanium alloy substrate; and
(c) heating the surface so as to alloy titanium with the at least one beta phase stabiliser.

Step (c) may be carried out in the presence of nitrogen so as to nitride the surface.

The nitrogen may be nitrogen gas.

Step (c) may be carried out in the presence of nitrogen gas and an inert gas so as to nitride the surface.

The inert gas may be argon.

In another embodiment of the first aspect the present invention provides a method for surface modification of a titanium substrate or a titanium alloy substrate comprising:
(a) applying at least one beta phase stabiliser and at least one of TiC or TiN to a surface of the titanium substrate or titanium alloy substrate; and
(b) heating the surface so as to alloy titanium with the at least one beta phase stabiliser.

The at least one beta phase stabiliser and the at least one of TiC or TiN may be applied simultaneously.

The at least one beta phase stabiliser and the at least one of TiC or TiN may be applied by APS.

Step (b) may be carried out in an inert atmosphere, such as for example under argon.

In a second aspect the present invention provides a surface modified titanium substrate or titanium alloy substrate whenever obtained by the method of the first aspect.

BRIEF DESCRIPTION OF DRAWINGS

Embodiments of the invention will now be described by way of example only with reference to the accompanying drawings, in which.

DESCRIPTION OF EMBODIMENTS

Figure 1A:
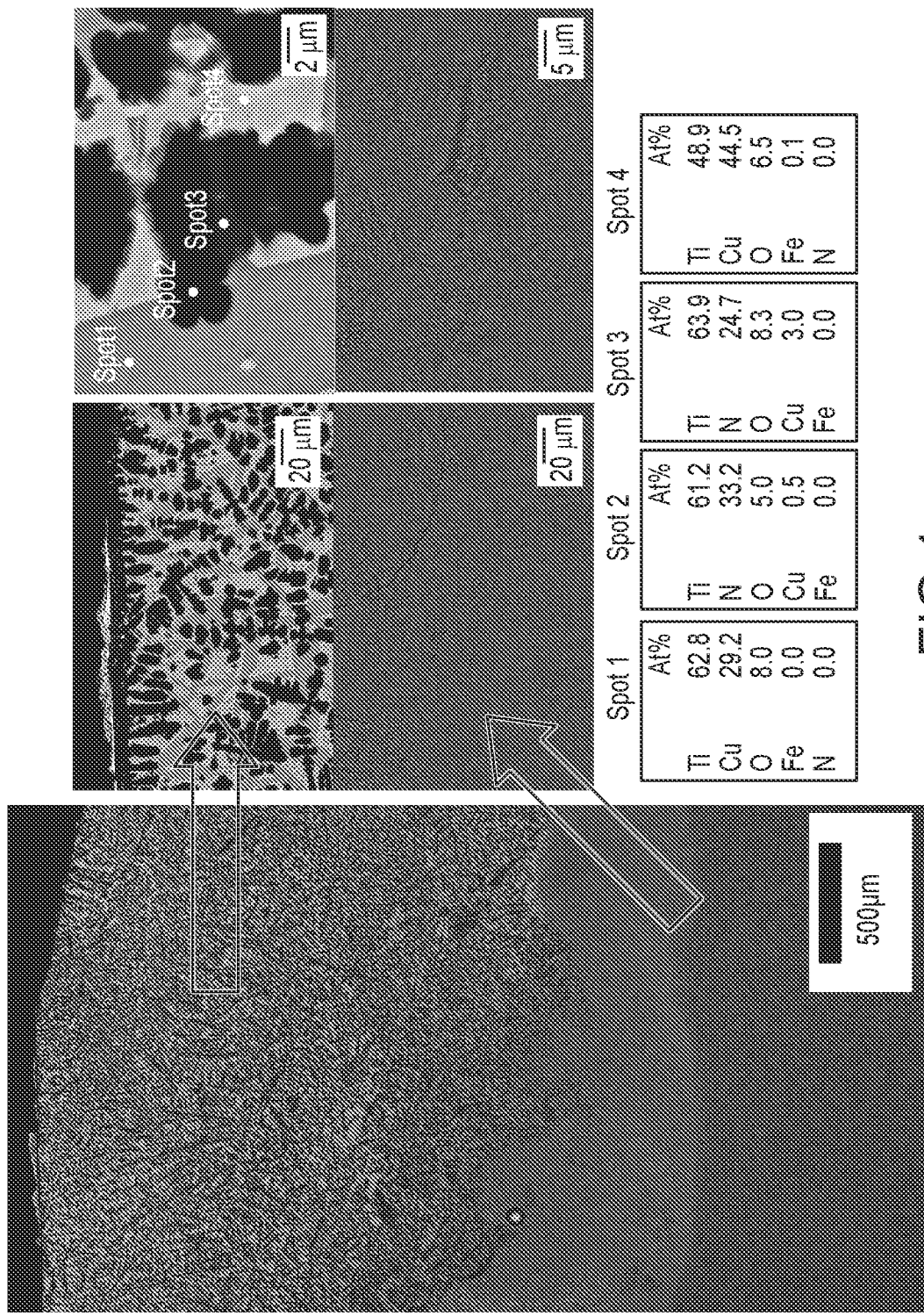
FIG. 1 are scanning electron microscope images showing microstructures of the surface regions of Examples 1 to 3 listed in Table 1.

In a first aspect the present invention provides a method for surface modification of a titanium substrate or a titanium alloy substrate comprising:
(a) applying at least one beta phase stabiliser to a surface of the titanium substrate or titanium alloy substrate; and
(b) heating the surface so as to alloy titanium with the at least one beta phase stabiliser.

The beta phase stabiliser may be a beta-isomorphous element or a beta-eutectoid element. Beta-isomorphous elements exhibit complete mutual solubility with beta titanium, whereas beta-eutectoid elements have restricted solubility in beta titanium and form intermetallic compounds by eutectoid decomposition of the beta phase. Examples of beta-isomorphous elements suitable for use in the method include, but are not limited to one or more of tungsten, vanadium, molybdenum, niobium, tantalum, or any combination thereof. Examples of beta-eutectoid elements suitable for use in the method include, but are not limited to chromium, iron, copper, silicon, manganese or any combination thereof. In one embodiment the beta-eutectoid element is copper.

In alternative embodiments the beta phase stabiliser is a compound comprising a beta phase stabiliser element, such as for example a carbide, oxide or intermetallic compound. The beta phase stabiliser element may be any element that is capable of stabilising the beta phase of titanium, such as a beta isomorphous element or a beta-eutectoid element as defined herein. In one embodiment the compound comprising a beta phase stabiliser element is tungsten carbide.

The step of applying at least one beta phase stabiliser to a surface of the titanium substrate or titanium alloy substrate may further comprise applying titanium or titanium alloy to the surface.

Applying at least one beta phase stabiliser to a surface of the titanium substrate or titanium alloy substrate may be conducted in any manner that deposits the beta phase stabiliser on the surface of the substrate. Exemplary techniques include, but are not limited to, electrodeposition, electroless deposition, thermal spraying, slurry coating, wire deposition, chemical vapour deposition, physical vapour deposition and plasma vapour deposition.

There are several variations of thermal spraying, including, plasma spraying, detonation spraying, wire arc spraying, flame spraying, high velocity oxy-fuel coating spraying, high velocity air fuel spraying, warm spraying and cold spraying. In one embodiment the at least one beta phase stabiliser is applied to a surface of the titanium substrate or titanium alloy substrate performed using atmospheric plasma spraying (APS).

The at least one beta phase stabiliser may be applied to a surface of the titanium substrate or titanium alloy substrate at a thickness between about 50 microns and about 500 microns, or between about 75 microns and about 500 microns, or between about 100 microns and about 500 microns, or between about 100 microns and about 400 microns, or between about 150 microns and about 400 microns.

Heating the surface so as to alloy titanium or titanium alloy with the at least one beta phase stabiliser may be achieved by any process having sufficient energy density to alloy titanium with the at least one beta phase stabiliser. In some embodiments, heating is performed by subjecting the surface to an electric arc or a plasma arc. The plasma arc may be obtained from a plasma arc welder. It has been found by the applicant that heating the surface with an electric arc from a gas tungsten arc welder represents a cost-effective and simple method to alloy titanium with the at least one beta phase stabiliser. In alternative embodiments a laser may be used to alloy titanium or titanium alloy with the at least one beta phase stabiliser.

In some embodiments heating the surface so as to alloy titanium with the at least one beta phase stabiliser may be performed in the presence of nitrogen so as to also nitride the surface. For example, the surface may be heated in the presence of nitrogen gas. In some embodiments the surface may be heated in the presence of nitrogen gas and an inert gas, such as for example, argon. The relative proportions of nitrogen gas and inert gas may be chosen so as to control the relative proportions of TiN and $Ti_2N$ phases in the titanium nitride layer as well as in the microstructure. Preferred relative proportions of nitrogen gas to inert gas will depend on the particular application, but typically range between 90:10 and 20:80, or 80:20 to 70:30 on a volume percent basis.

In some embodiments the method may comprise one or more nitriding steps prior to application of the at least one beta phase stabiliser. In these embodiments, the final step in the method is typically heating the surface so to alloy the at least one beta phase stabiliser with the nitrogen-enriched titanium substrate or titanium alloy substrate. Alternatively, if it is desired to further nitride the surface, the final step may involve heating the surface in the presence of nitrogen so as to further nitride the surface and alloy titanium with the at least one beta phase stabiliser.

Multi-step nitriding with differing nitrogen to inert gas compositions in each step allows for a nitride gradient to be achieved which may be useful in certain wear critical applications.

The at least one beta phase stabiliser may be applied together with at least one of TiC or TiN. In one embodiment, the at least one beta phase stabiliser and the at least one of TiC and TiN may be applied to the surface simultaneously. This may be achieved by, for example, feeding a mixture of TiN or TiC and a beta phase stabiliser (both in powder form) into a heat source, such as a plasma transferred arc (PTA), and the melting, alloying and metallurgical fusing of a coating on the titanium substrate or titanium alloy substrate. In one embodiment, a powdered mixture of TiN or TiC and beta phase stabiliser may be sprayed onto the titanium substrate or the titanium alloy substrate using APS and the surface heated so as to alloy the beta phase stabiliser with tantalum.

In another embodiment steps (a) and (b) may be carried out simultaneously. For example, a beta phase stabiliser may be sprayed onto the titanium substrate or the titanium alloy substrate using APS and the surface simultaneously heated. Heating can be performed in a nitrogen atmosphere where surface nitriding is also desired.

Those skilled in the art will appreciate that the methods disclosed herein are applicable to a wide range of substrates comprising unalloyed titanium and titanium alloys. Examples of unalloyed titanium include, but are not limited to Grades 1, 2, 2H and 3. Titanium alloys include any and all alpha, beta, alpha-beta or near-alpha alloys. In some embodiments the titanium alloy is a Grade 5 (Ti-6Al-4V) or Grade 12 alloy. Ti-6Al-4V is widely used in aircraft and engine manufacture as well as in the marine and mining industries, for example in blades, discs, rings, airframes, fasteners and hubs.

Prior to performance of the method, the titanium substrate or titanium alloy substrate may be in a raw, as manufactured state or pre-surface modified, for example through annealing, age hardening, work hardening, or nitriding.

When compared to previously proposed methods such as nitriding, it is thought that the present methods provide highly refined dendritic microstructure in the surface with high hardness and improved fracture toughness and significantly reduced thermal stress induced cracking tendency. The methods have been shown to improve both wear and corrosion resistance due to microstructural refinement of the hard reinforcement phase and the formation of a tough beta phase matrix phase.

The invention also provides, in another aspect, a surface modified titanium substrate or titanium alloy substrate whenever obtained by the method of the first aspect.

The following Examples are intended to illustrate the invention. They are not intended to limit the scope of the invention.

EXAMPLES

Table 1 below details surface modifications of examples titanium and titanium alloy substrates that were prepared for a representative beta eutectoid element (Example 1) and a representative beta isomorphous element (Example 2). Nitriding of 15 mm thick Ti Grade 2 plate material is provided as a comparative example (Example 3). In Examples 1 to 3, surface melting was performed by gas tungsten arc welding (GTAW) in the presence of nitrogen (80 volume %, balance argon). Examples 1 and 2 as performed on the same substrate material are two-step processes. In Examples 1 and 2, step 1 involves an APS coating comprising Cu as a representative beta-eutectoid element (Example 1), and a compound containing WC as a representative beta isomorphous element with Ti as a bonding or diluting constituent (Example 2). In Examples 1 and 2, the APS coating was 100-400 microns in thickness. In Examples 1 and 2, step 2 is a nitriding step using GTAW as the heat source to melt the APS layer and underlying Ti substrate in the presence of the stated gas mixtures. The gas mixture presented here is fixed at 80 volume % nitrogen (the balance being argon) for convenient comparison. Those skilled in the art will appreciate that other gas mixtures can be applied to effectively control the quantity of the titanium nitride phase and the resulting modified layer hardness.

TABLE 1

| Example | Substrate surface modification | Step 1 | Step 2 | HV | $K_{IC}$ (MPam$^{-1/2}$) | $D_c$ (cm$^{-1}$) |
|---|---|---|---|---|---|---|
| 1 | Ti Grade 2 Beta-eutectoid | APS coating of Cu (~400 μm) | GTAW surface melting in 80N$_2$/20Ar gas mixture | ~586 | ~21 | ~1 |
| 2 | Ti Grade 2 Beta isomorphous | APS coating of WC/Ti (~400 μm) at volume fraction of 80/20 | GTAW surface melting in 80N$_2$/20Ar gas mixture | 1206 | 15 | ~2 |
| 3 | Ti Grade 2 Nitriding | GTAW surface melting in 80N$_2$/20Ar gas mixture | | ~1150 | ~5 | ~8 |

Figure 1B:
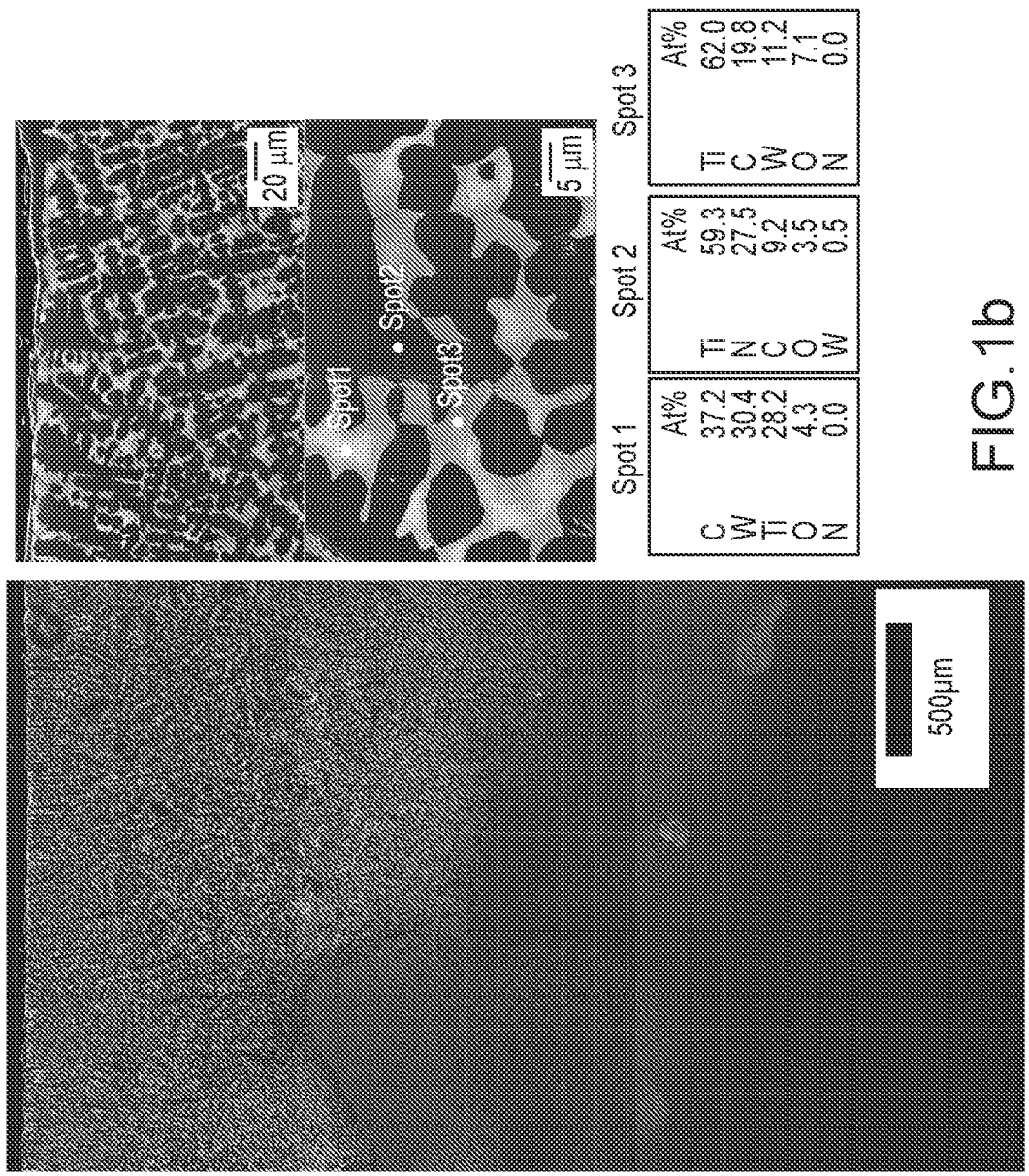
Figure 1C:
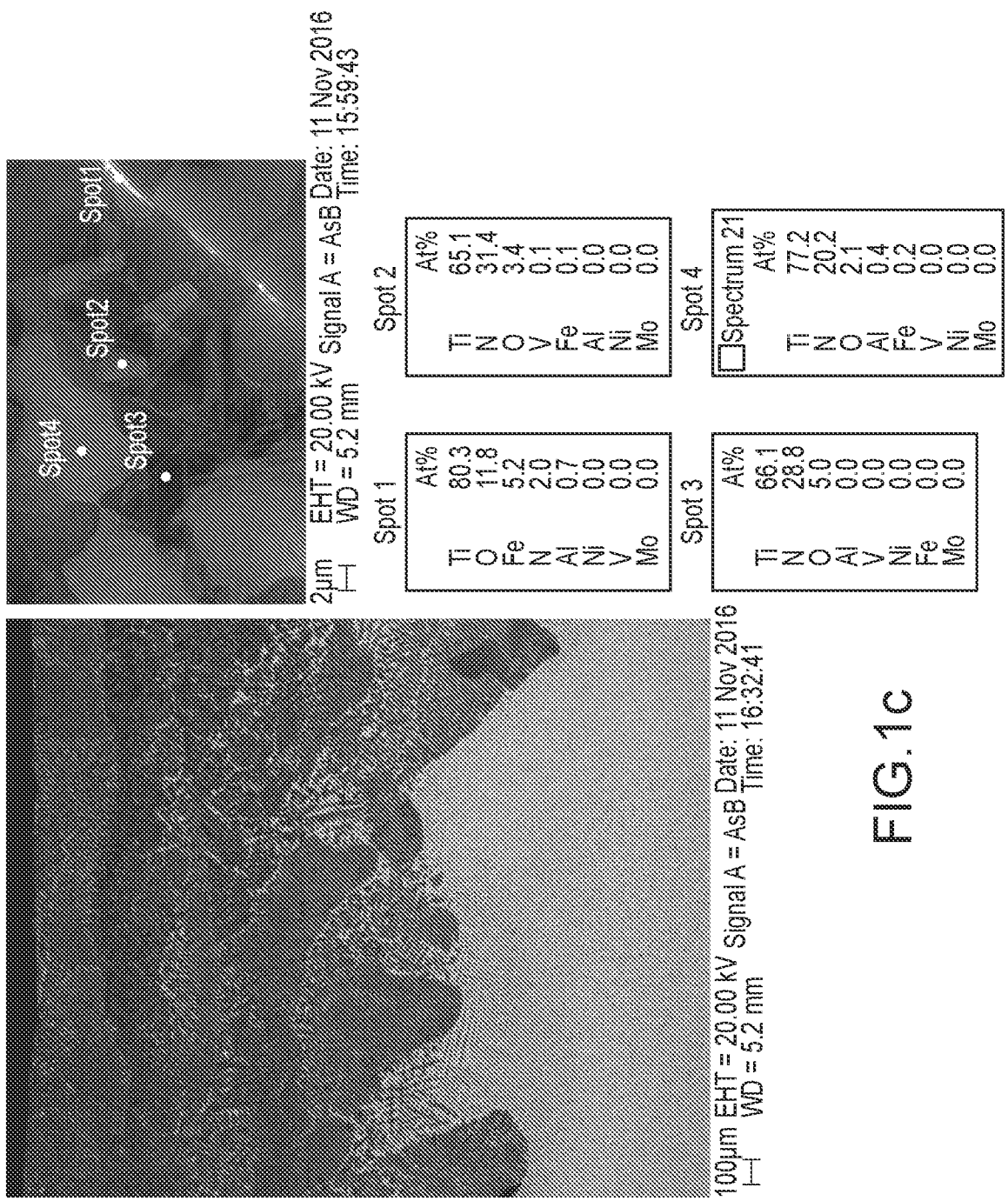
Figure 2A:
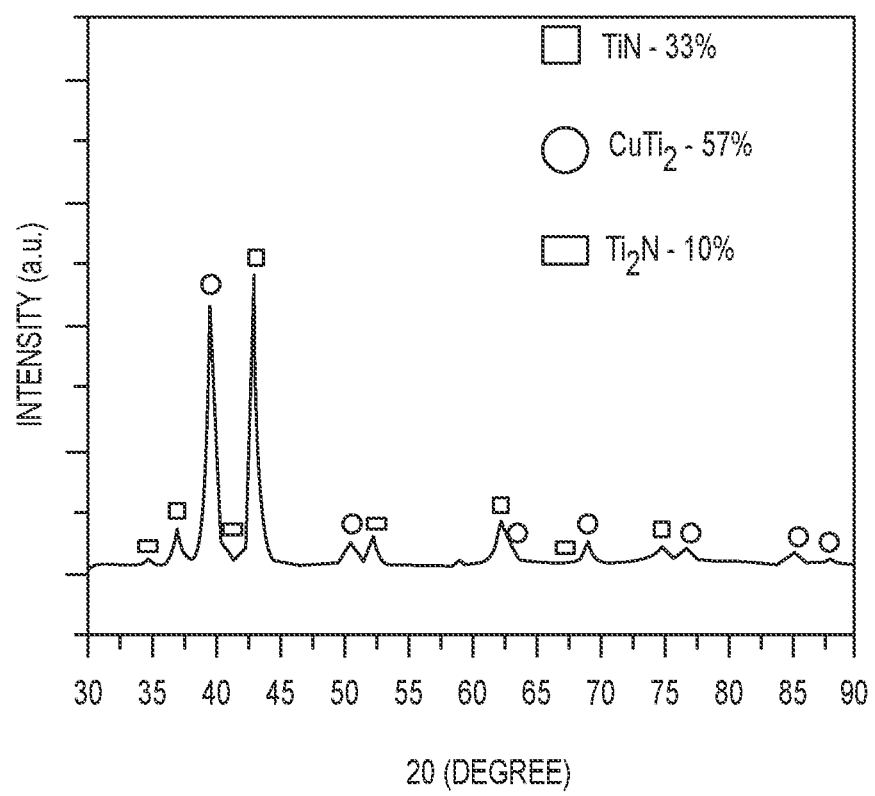
FIG. 2 are graphs showing phase constituents and fractions of the surface regions of Examples 1 to 3 listed in Table 1.
Figure 2B:
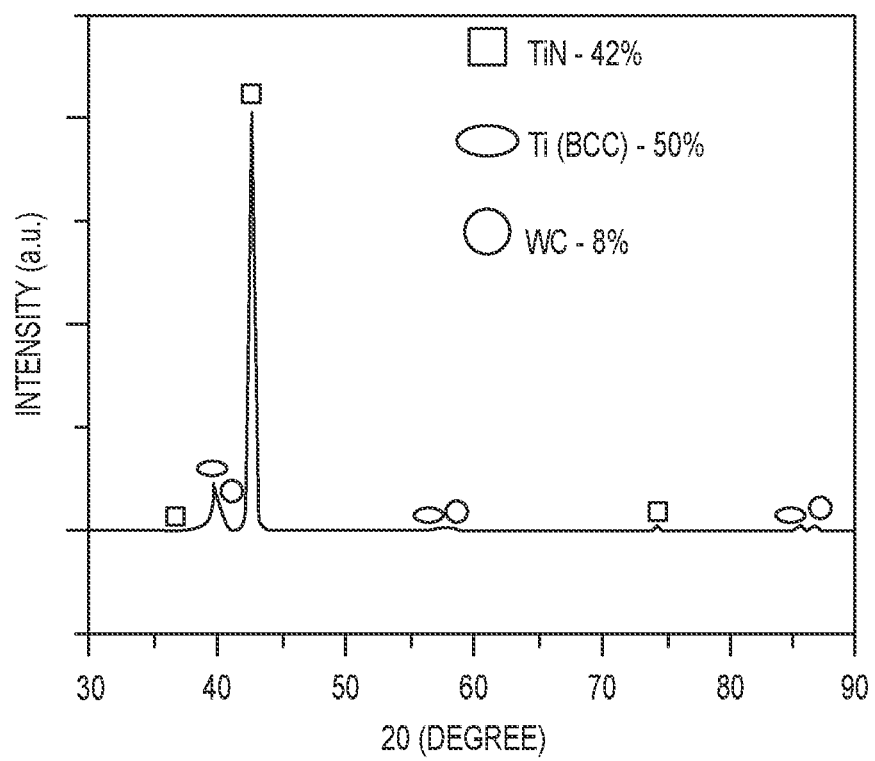
Figure 2C:
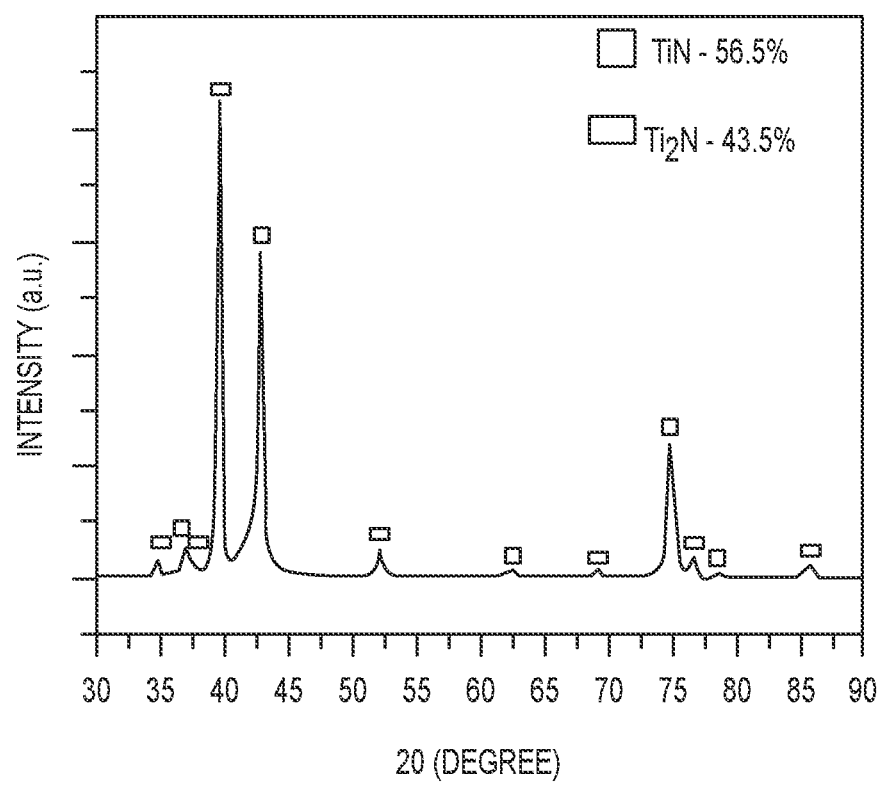

All Examples in Table 1 produced surface layers distinct from the substrate as shown in the scanning electron microscope images in FIGS. 1(a) to (c). All phases present in the layers were determined by X-ray diffraction and are presented in FIG. 2. Example 3 produced a microstructure comprising TiN primary dendrites (~53 vol. %) and a Ti$_2$N matrix phase (~47 vol. %). Example 1 formed a surface layer comprising fine TiN dendrites (~33 vol. %), a matrix phase of CuTi$_2$ (~53 vol. %) and a small volume of Ti$_2$N (~10 vol. %). Example 2 produced a microstructure consisting of fine primary dendrites of TiN (~42 vol. %), a beta titanium matrix phase (~50%) and a fine (<10 micron) WC phase which was either remnant unmelted powder from the APS coating or which precipitated during solidification.

Figure 3A:
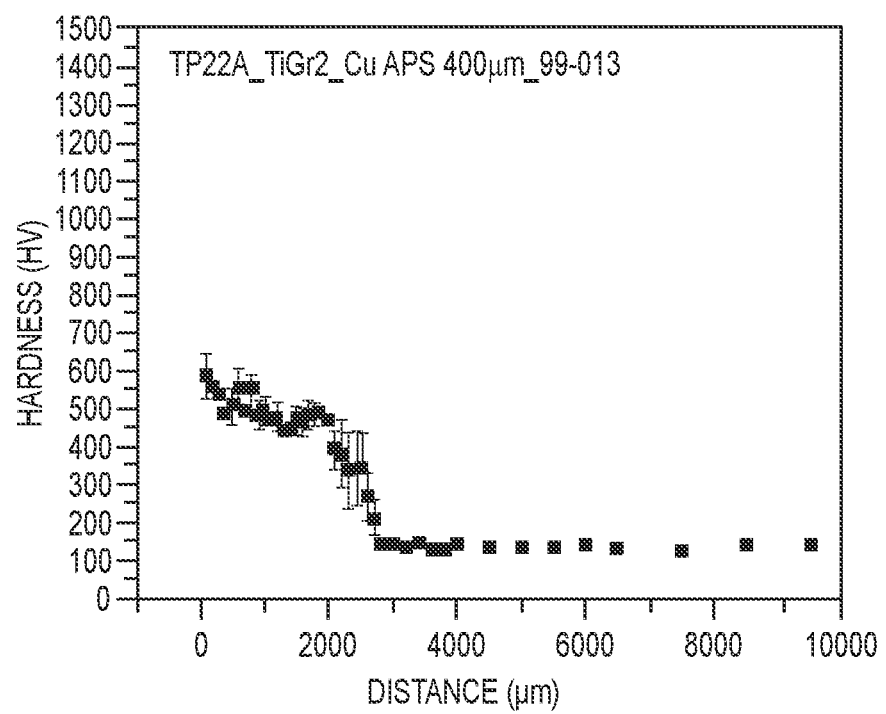
FIG. 3 are graphs showing hardness profiles of the surface regions of Examples 1 to 3 listed in Table 1.
Figure 3B:
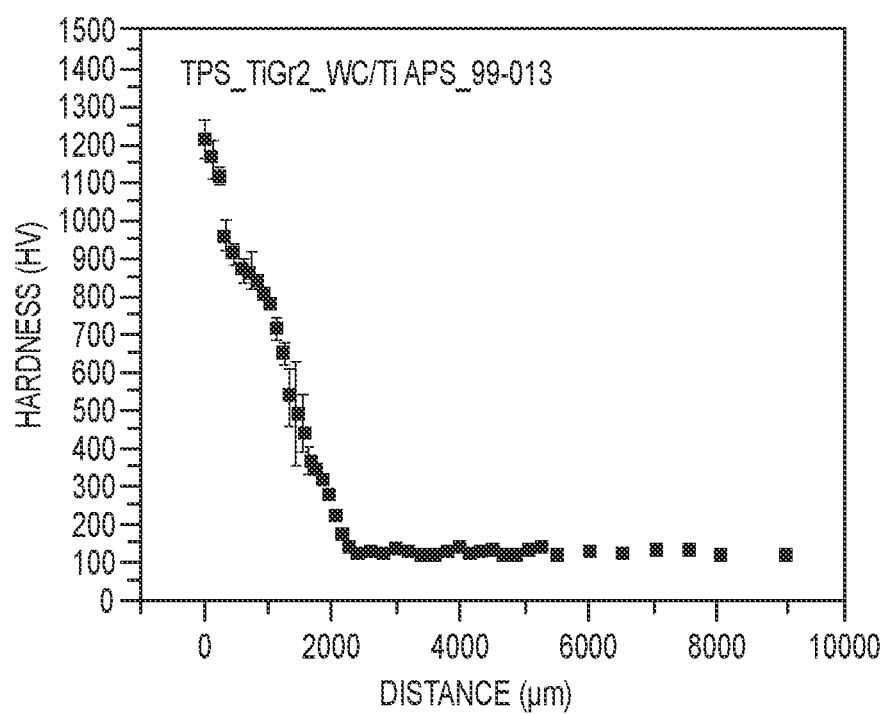
Figure 3C:
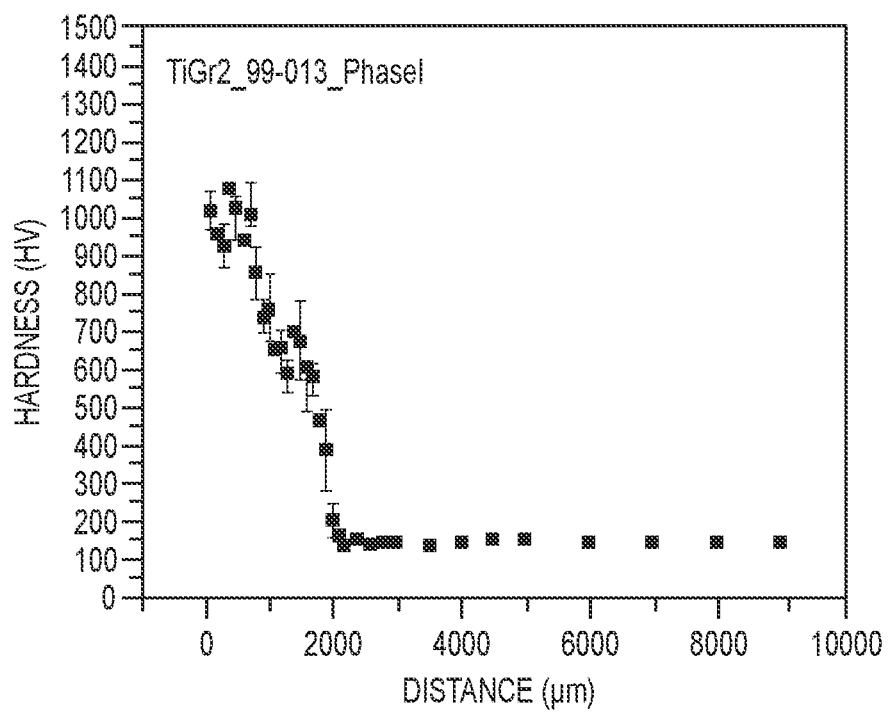

The hardness profiles measured by Vickers micro-hardness testing with an applied load of 50 g are presented in FIG. 3. All of Examples 1 to 3 listed in Table 1 substantially increase the hardness relative to the underlying Ti Grade 2 substrate. The hardness gradually decreases from the surface to the underlying substrate. Table 1 summarises the hardness of the modified surface for Examples 1 to 3 at a depth of 100 microns under the surface.

Table 1 also demonstrates that the addition of a beta stabilizing element to the nitrided surface had a beneficial impact on the fracture toughness ($K_{IC}$) of the surface modification, while maintaining a good hardening effect. Fracture toughness was measured by measuring the crack length at the corners of Vickers hardness indents made in the cross-section of the coating, a common technique for hard coatings. Further, the cracking density of surface modification was reduced by the alloying of the nitride surface with a beta stabilizing element (as shown in Table 1). Without wishing to be bound by any particular theory, this may be attributed to the formation of a tough beta titanium matrix phase, which substitutes the more brittle $Ti_2N$ matrix phase formed when Ti and Ti alloys are nitrided by GTAW under the same process conditions in the absence of beta phase stabiliser enrichment.

Low- and High-Stress Abrasion Testing

Samples of unmodified Ti Grade 2 and Examples 1 to 3 listed in Table 1 were subjected to ASTM G65 dry sand/rubber wheel test method for quantifying the low-stress abrasion resistance. The immediate 50-100 microns was mechanically ground off of the surface of the test specimens to create a flat surface prior to testing. A load of 130N was applied, a controlled flow (about 500 g/min) of abrading sand was also supplied along with a standard procedure for coated specimens ('Procedure B' in ASTM G65-2000 revolution at 200 rpm). The test samples were weighed on a microbalance (±0.01 g) before and after the test to determine the mass loss, which was converted to a volume loss using the measured density of the surface-modified regions. Density was determined by producing very small samples of the coating of known geometry.

Samples of unmodified Ti Grade 2 and selected variants listed in Table 1 were subjected to ASTM B611 high stress abrasion testing. The immediate 50-100 microns was mechanically ground off of the surface of the test specimens to create a flat surface prior to testing. In this test, a flat test specimen was held in a vertical position tangent to a rotating AISI 1020 steel wheel immersed in a water slurry of silica particles. The test specimen was pressed against the rotating steel wheel with 190 N force by a lever arm. 'Procedure A' of ASTM B611 was utilised which involves testing for a duration of 1000 revolutions and a rotation rate of 100 rpm. Mass loss was calculated by weighing the samples before and after the test. Mass loss was converted into volume loss to rank the samples for abrasive resistance.

All wear data is presented in Table 2. All surface modifications had the effect of reducing the wear rates of unmodified Ti Grade 2 in the conditions of low-stress and high-stress abrasive wear testing. Comparison of Example 3 with unmodified Ti Grade 2 shows that the low- and high-stress abrasive wear rate decreased due to nitriding. The addition of a beta stabilizing element to the nitride surface had a substantial effect on the wear rate. Relative to Example 3, the low-stress and high-stress abrasive wear rate was reduced by the addition of beta stabilizing elements. Without wishing to be bound by any particular theory, this may be attributed to the formation of a tough beta titanium matrix phase, which substitutes the more brittle $Ti_2N$ matrix phase formed when Ti and Ti alloys are nitrided by GTAW under the same process conditions in the absence of beta phase stabiliser enrichment.

TABLE 2

| Example | ASTM G65 Volume loss $mm^3$ | ASTM B611 Volume loss $mm^3$ |
|---|---|---|
| Ti Grade 2 as-received | 185.93 ± 3.45 | 486.11 ± 10.82 |
| 1 | 10.79 ± 0.45 | — |
| 2 | 22.54 ± 1.86 | 182.0 ± 6.70 |
| 3 | 63.98 ± 2.72 | 327.55 ± 3.41 |

High Temperature Sulfuric Acid Corrosion Test

Testing was conducted to evaluate the effect of modifying the surface of titanium substrates by the process variants detailed in Examples 1 to 3 in Table 1 on the corrosion behaviour in a challenging corrosive environment, where titanium is known to offer moderate performance. These conditions were designed to resemble service conditions in a high-pressure acid leaching (HPAL) or pressure oxidation (PDX) hydrometallurgical process.

A Parr 4748 large capacity acid digestion vessel was used for corrosion testing in an aqueous solution of 99% sulfuric acid. Test samples measuring 5 mm×5 mm×0.5 mm were prepared from the surface modified substrates such that the samples consisted only of the coating layers. The samples were ultrasonically cleaned and weighed before the test and then placed inside the vessel using a Teflon® holder. The sulfuric acid was filled to <50% (30 mL) capacity of the vessel which was sealed and transferred to a muffle furnace and heated at 200° C. for 7 days. The samples were ultrasonically cleaned, thoroughly dried and weighed after the corrosion test. The mass loss was calculated and converted into mm/year.

All corrosion data in mm/year are presented in Table 3. Uniform general corrosion was observed for the unmodified Ti Grade 2 substrate material at a corrosion rate of 3.85±0.12 mm/yr. The corrosion rate slightly increased to 4.27±0.19 mm/year (~11%) for a substrate obtained following a nitriding step alone (Example 3, Table 1) and pitting corrosion was also evident. The addition of a beta stabilizing element to the nitride surface had a variable effect on the corrosion rate. Relative to Example 3, the corrosion rate was reduced by the addition of beta stabilizing element as per Example 2. A general corrosion behaviour was observed consisting of the selective corrosion of the matrix phase. Without wishing to be bound by any particular theory, corrosion behaviour in this tested environment may be determined by the alloy chemistry of the matrix phase.

TABLE 3

| Example | Corrosion rate mm/year |
|---|---|
| Ti Grade 2 as-received | 3.85 ± 0.12 |
| 2 | 4.02 ± 0.10 |
| 3 | 4.27 ± 0.19 |

The invention is not limited to the examples that have just been given. In other words, those skilled in the art will appreciate that the examples may be reproduced without difficulty, and with similar success, by substituting any of the generically or specifically described beta phase stabilisers, process conditions, and sequence of process steps mentioned anywhere in this specification for those actually used in the preceding examples.

Embodiments of the present invention provide surface modification methods that are both generally and specifically useful for providing titanium and titanium alloy substrates with improved properties, such as for example improved wear and corrosion resistance.

For the purpose of this specification, the word "comprising" means "including but not limited to," and the word "comprises" has a corresponding meaning.

The above embodiments have been described by way of example only and modifications are possible within the scope of the claims that follow.

The invention claimed is:

1. A method for modification of a surface of a substrate of titanium or titanium alloy, the method comprising:

nitriding the surface to form a hard titanium nitride phase;

alloying the nitride surface with a beta phase stabilizer to form a tough beta titanium phase which surrounds the hard titanium nitride phase.

2. The method of claim 1, wherein the titanium alloy is an alpha, beta, alpha-beta or near-alpha alloy.

3. The method of claim 1, wherein the beta phase stabilizer is a beta isomorphous element or a beta-eutectoid element.

4. The method of claim 3, wherein the beta isomorphous element is tungsten, vanadium, molybdenum, niobium, tantalum or any combination thereof.

5. The method of claim 4, wherein the beta isomorphous element is tantalum, niobium or molybdenum.

6. The method of claim 3, wherein the beta-eutectoid element is chromium, iron, copper, silicon, manganese or any combination thereof.

7. The method of claim 6, wherein the beta-eutectoid element is copper, silicon or manganese.

8. The method of claim 1, wherein the beta stabilizer is a compound comprising a beta stabilizer.

9. The method of claim 8, wherein the compound comprising the beta stabilizer is a carbide, oxide or intermetallic compound.

10. The method of claim 9, wherein the compound comprising the beta stabilizer element is tungsten carbide.

11. A surface modified substrate of titanium or titanium alloy formed by the method of claim 1.

\* \* \* \* \*